United States Patent
Yamamoto

(10) Patent No.: US 7,878,479 B2
(45) Date of Patent: *Feb. 1, 2011

(54) ADJUSTMENT VALVE

(75) Inventor: Takashi Yamamoto, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 547 days.

This patent is subject to a terminal disclaimer.

(21) Appl. No.: 11/661,576

(22) PCT Filed: Aug. 31, 2005

(86) PCT No.: PCT/JP2005/015941

§ 371 (c)(1),
(2), (4) Date: Nov. 27, 2007

(87) PCT Pub. No.: WO2006/025466

PCT Pub. Date: Mar. 9, 2006

(65) Prior Publication Data
US 2008/0099081 A1 May 1, 2008

(30) Foreign Application Priority Data
Aug. 31, 2004 (JP) ............................. 2004-252754

(51) Int. Cl.
F16K 31/00 (2006.01)
(52) U.S. Cl. .................... 251/61.4; 251/331; 251/335.2
(58) Field of Classification Search ............... 251/61.4, 251/61.2, 61, 331, 335.2
See application file for complete search history.

(56) References Cited
U.S. PATENT DOCUMENTS
4,501,298 A * 2/1985 Inada et al. ............. 137/625.48
4,872,638 A * 10/1989 Thompson et al. ............ 251/54

(Continued)

FOREIGN PATENT DOCUMENTS
JP 58-2434 1/1983

(Continued)

OTHER PUBLICATIONS
U.S. Appl. No. 11/661,506, Fluid Controller, filed Nov. 27, 2007.

Primary Examiner—John K Fristoe, Jr.
Assistant Examiner—Andrew J Rost
(74) Attorney, Agent, or Firm—Jordan and Hamburg LLP

(57) ABSTRACT

An adjustment valve includes a first diaphragm integrally formed from an attachment section engaged with and fixed to the bottom of a rod, a joining section to which a valve body is fixed, a thin film section radially extending from a shoulder section, a thick wall section continuous with the thin film section, and a seal section provided at the peripheral edge of the thick wall section. The second diaphragm has a central hole, and includes an integrally formed thin film section radially extending from a thick wall section at the center hole, and a seal section is provided at the peripheral edge thereof. A diaphragm hold-down member penetrates the central hole at the shoulder section of the rod, causing the second diaphragm to be sandwiched and fixed. The rod is disposed with play in the through-hole in the bottom of the cylinder, and is supported by a spring engaged between a step section of the cylinder and the bottom surface of the shoulder in a state such that radial movement is prevented.

6 Claims, 9 Drawing Sheets

U.S. PATENT DOCUMENTS

| | | | |
|---|---|---|---|
| 5,002,086 A * | 3/1991 | Linder et al. | 137/312 |
| 5,139,225 A * | 8/1992 | Olson et al. | 251/61.2 |
| 5,549,137 A | 8/1996 | Lenz et al. | |
| 5,573,032 A | 11/1996 | Lenz et al. | |
| 7,063,304 B2 * | 6/2006 | Leys | 251/331 |
| 7,108,241 B2 | 9/2006 | Yoshino et al. | |

FOREIGN PATENT DOCUMENTS

| | | |
|---|---|---|
| JP | 1-134213 | 5/1989 |
| JP | 5-240370 | 9/1993 |
| JP | 5-346185 | 12/1993 |
| JP | 6-83456 | 3/1994 |
| JP | 9-502292 | 3/1997 |
| JP | 9-303609 | 11/1997 |
| JP | 10-274345 | 10/1998 |
| JP | 11-051223 | 2/1999 |
| JP | 11-161342 | 6/1999 |
| JP | 2001-153239 | 6/2001 |
| JP | 2004-164033 | 6/2004 |
| JP | 2005-155878 | 6/2005 |
| WO | WO-2004-006035 | 1/2004 |

* cited by examiner

5a

5b

ADJUSTMENT VALVE

BACKGROUND OF THE INVENTION

The present invention relates to an adjustment valve used for fluid transport pipes that require flow regulation. More specifically, it relates to an adjustment valve suitable for use mainly in ultrapure water lines and various chemical solution lines in the semiconductor industry.

One example of a conventional fluid control valve is a micro-fluid valve as shown in FIG. 9 (see, for example, Patent Document 1). The constitution will be explained with reference to FIG. 9. There are provided a diaphragm valve 42 in which an annularly formed valve body 37 that comes in contact with and separates from a valve seat 36 is formed integrally with a needle 39 insertable into an orifice 38 provided at the center of the valve seat 36 with thin films constituting an outer film 40 and inner film 41; operation means for causing the valve body 37 to come in contact with and separate from the valve seat 36; and an adjustment screw 43 for adjusting the position of the needle 39.

Regarding operation, in a state where the valve body 37 is separated from the valve seat 36 by operation means, the needle 39 is inserted into the orifice 38 to a prescribed degree using the adjustment screw 43, thereby regulating the flow of the control fluid to flowing through the orifice 38.

Patent Document 1: Published Japanese Patent No. 2999429 (page 5, FIG. 1)

However, the conventional fluid control valve has the following problems.

(1) The needle position is adjusted using the adjustment screw 43 and thus when a valve is opened just slightly, just a little rotation of the adjustment screw 43 causes a flow to change, making regulation extremely difficult.

(2) The regulation must be performed on-site, thus restricting the uses and installation locations of the fluid control valve.

(3) While it is possible to control flow by regulating the pressure of externally supplied compressed air, as can be seen from the structure, the sliding resistance of a piston 44 has a major effect, lowering both responsiveness and hysteresis. Therefore, the fluid control valve is unsuitable for high-precision flow control.

(4) A spring 45 causes an impelling force to operate on the piston 44. In a case where a chemical solution is a fluid, the spring 45 is subject to corrosion caused by the medical solution, resulting in poor operation. In a case where operation means constitutes a solenoid valve, corrosion also causes poor operation.

SUMMARY OF THE INVENTION

The present invention is configured in view of the above problems of the conventional art, and its object is to provide an adjustment valve that allows easy flow regulation, is capable of remote operation, has excellent anti-corrosion properties, achieves a compact size, and reduces costs for parts.

A first aspect of the present invention is an adjustment valve having integrally fitted therein a main body 1 having a valve chamber 10 at an upper portion thereof and an inflow channel 11 and outflow channel 12 that respectively communicate with the valve chamber 10, and, at the bottom center of the valve chamber, an opening 13 with which the outflow channel 12 communicates; a cylinder 2 provided with a through-hole 15 at the bottom center thereof, and with a ventilation hole 16 in a lateral surface thereof, the cylinder 2 and the main body 1 sandwiching and fixing a first diaphragm 4 therebetween; and a bonnet 3 provided with a working fluid communication hole 17 at an upper portion thereof, the bonnet 3 and cylinder 2 sandwiching and fixing the peripheral edge of a second diaphragm 6 therebetween, wherein:

the first diaphragm 4 comprises an integrally formed: shoulder section 18; attachment section 19 positioned above the shoulder section 18 and engaging with and fixing the bottom of the rod 7 (described below); a joining section 31 positioned below the shoulder section and to which a valve body 5 (described below) is fixed; a thin film section 20 radially extending from the shoulder section 18; a thick wall section 21 consecutive with the thin film section 20, and a seal section 22 provided at the peripheral edge of the thick wall section 21; and the valve body 5 is fixed to the joining section 31 so as to enter and exit from the opening 13 of the valve chamber 10 in response to the vertical movement of the rod 7;

the second diaphragm 6 has a central hole 23, and comprises an integrally formed: thick wall section 24 around such hole, thin film section 25 radially extending from the thick wall section 24, and seal section 26 provided at the peripheral edge of the thin film section 25; a diaphragm hold-down member 8 penetrates the central hole 23 at the shoulder section 28 on the upper section of the rod 7 to the bottom of which the attachment section 19 of the first diaphragm 4 is fixed, thus sandwiching and fixing the second diaphragm 6; and the rod 7 is disposed in the through-hole 15 in the bottom of the cylinder 2 with play, and is supported by a spring 9 engaged between a step section 34 of the cylinder 2 and the bottom surface of the shoulder section 28 in a state such that radial movement is prevented.

A second aspect of the present invention is an adjustment valve wherein the first diaphragm 4 has a joining section 31 having a valve body 5 detachably fixed thereto. A third aspect of the present invention is an adjustment valve wherein the first diaphragm 4 is formed of PTFE. A fourth aspect of the present invention is an adjustment valve wherein a seal section 22 of the first diaphragm 4 axially protrudes from the peripheral edge of the thick wall section 21 in an L-shaped cross-section. A fifth aspect of the present invention is an adjustment valve wherein an opening 14 in the inflow channel 11 of the main body 1 has a roughly crescent-shaped transverse cross-section. A sixth aspect of the present invention is an adjustment valve wherein the entire surface of the spring is coated with a fluorine resin, and a fluorine resin is employed for other materials.

DETAILED DESCRIPTION OF THE INVENTION

An embodiment of the present invention is explained below with reference to the drawings. Needless to say, the present invention is not restricted to the description of this embodiment.

Figure 4:
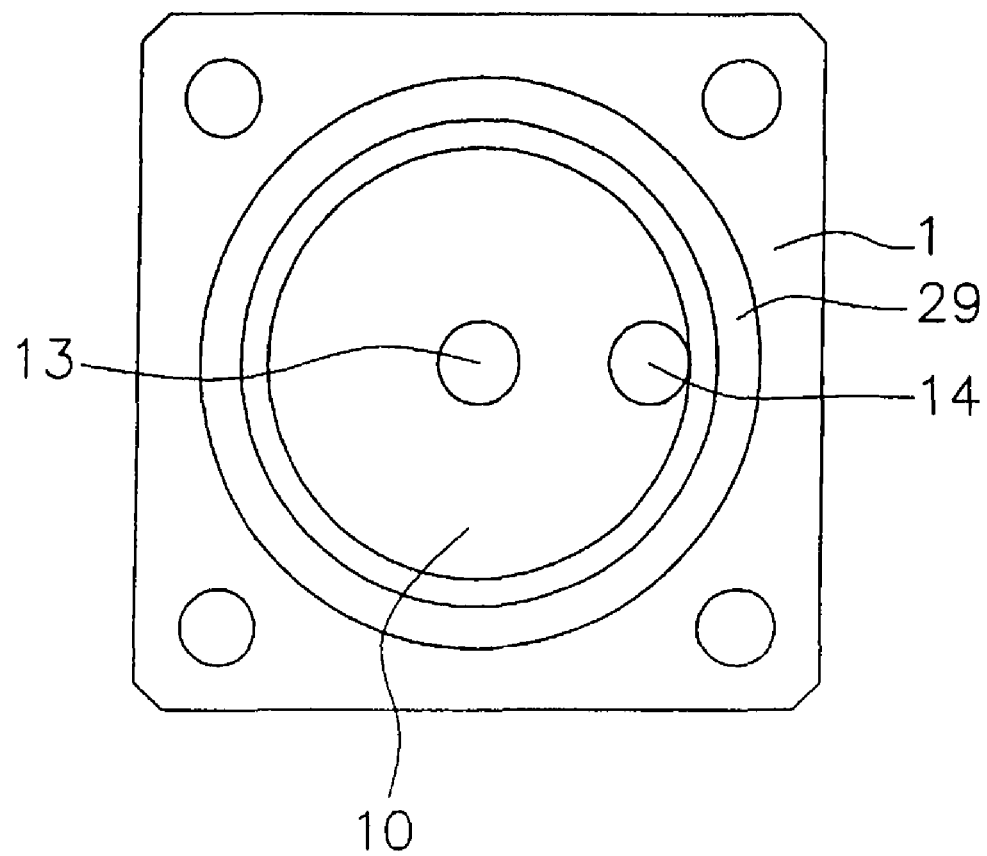
FIG. 4 is a plan view of a main body of the adjustment valve in FIG. 1.
Figure 5:
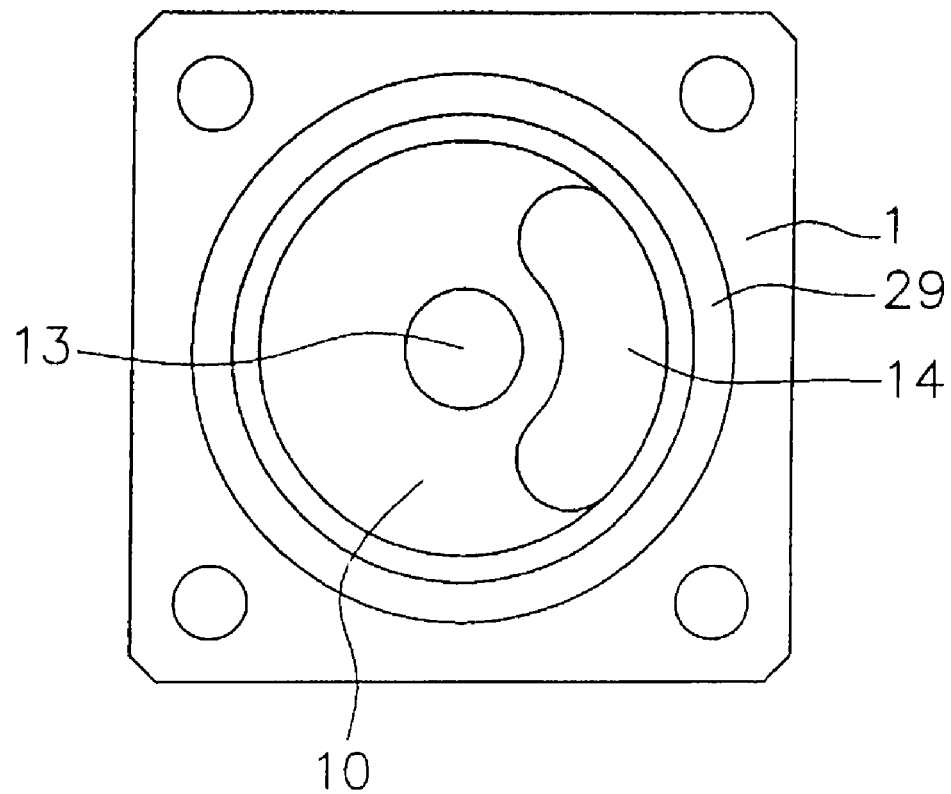
FIG. 5 is a plan view of a main body showing another embodiment of an adjustment valve according to the present invention.

In the drawings, 1 is a polytetrafluoroethylene (PTFE) main body provided with a cylindrical valve chamber 10 in the upper portion thereof, and an inflow channel 11 and outflow channel 12 in the lower portion thereof that respectively communicate with the valve chamber 10. At the valve chamber bottom center, there is an opening 13 that connects with the outflow channel 12, and at the periphery of the opening 13, an opening 14 that connects with the inflow channel 11. The opening 14 has a circular transverse cross-section as shown in FIG. 4, and when the opening 13 is widened to control a larger flow, the opening 14 preferably has a roughly crescent shape formed around the opening 13 provided at the valve chamber bottom center as shown in FIG. 5. The main body 1 has in the upper surface thereof an annular groove 29 with which a seal of a first diaphragm 4 engages.

Reference numeral 2 is a polyvinyl chloride (PVC) cylinder provided with a through-hole 15 at the bottom center thereof, a step section 34 in the bottom inner surface, and a ventilation hole 16 in the lateral surface thereof. The cylinder 2 and main body 1 sandwich and fix the peripheral edge of the first diaphragm 4 therebetween, and the cylinder 2 and a bonnet 3 sandwich and fix the peripheral edge of a second diaphragm 6 therebetween. The ventilation hole 16 in the lateral surface of the cylinder 2 is provided to discharge gas when a gas fluid passes through the first diaphragm 4.

3 is a PVC bonnet provided with a working fluid communication hole 17 at the top thereof so that air, oil or other working fluid can be introduced. In the present embodiment, the working fluid communication hole 17 is provided at the top of the bonnet 3. Alternatively, the same can be provided on a lateral surface. Further, an annular groove 30, with which the seal section 26 of the second diaphragm 6 engages, is provided at the peripheral bottom thereof. The main body 1, cylinder 2 and bonnet 3 thus explained are integrally fixed to each other using nuts and bolts (not shown in the drawings).

Reference numeral 4 is a PTFE first diaphragm. Above a shoulder section 18 an attachment section 19 engaged and fixed with a rod 7 and below the shoulder section 18 a joining section 31 fixing the valve body 5 are integrally provided in a protruding manner, centering on the shoulder section 18; on the portion radially extending from the shoulder section 18 there are provided a thin film section 20, a thick wall section 21 continuous with the thin film section 20, and a seal section 22 at the peripheral edge of the thick wall section 21, all of which are integrally formed. The thin film section 20 is roughly one-tenth the thickness of the thick wall section 21. The rod 7 and attachment section 19 can be fixed to each other not only by engaging but also by screwing. It is preferable that the joining section 31 and valve body 5 be fixed by screwing. The seal section 22 positioned at the outer peripheral edge of the first diaphragm 4 has an L-shaped cross-section in the axial direction, and engages with the annular groove 29 of the main body 1 via an O-ring 35, and pressed by an annular protrusion 27 [sic] provided at the bottom of the cylinder 2, and is thus sandwiched and fixed.

Figure 6:
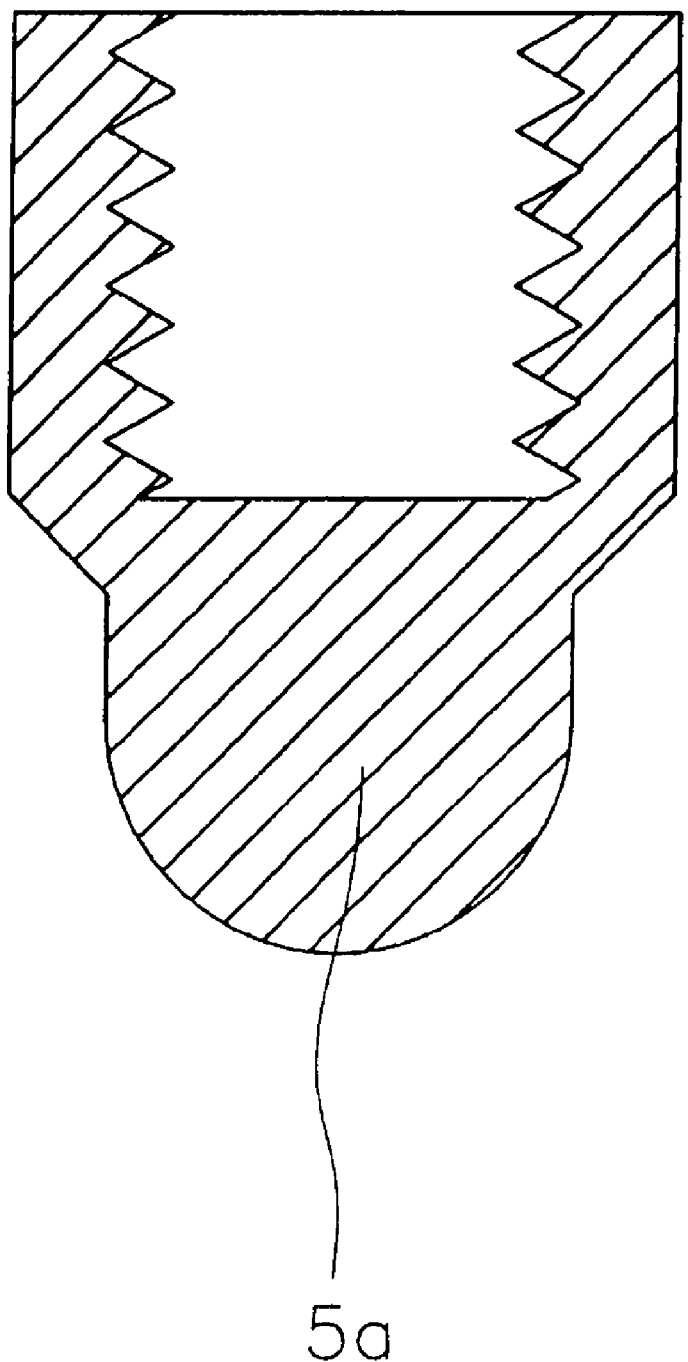
FIG. 6 is a vertical cross-sectional view showing another embodiment of a valve body.
Figure 7:
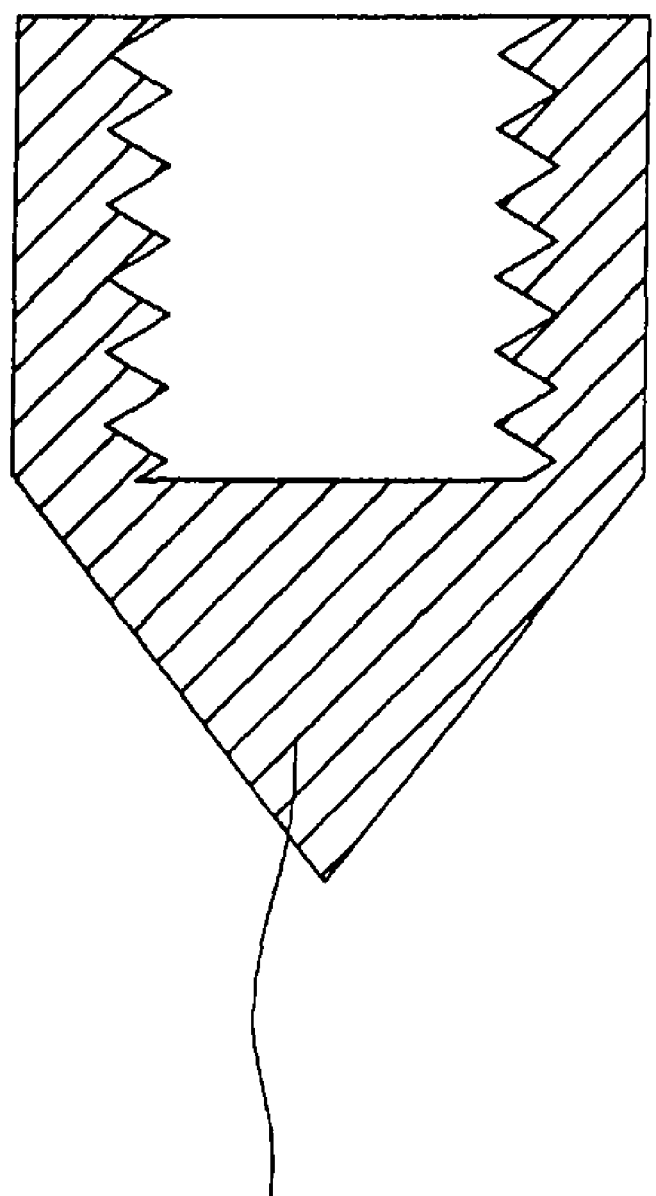
FIG. 7 is a vertical cross-sectional view showing yet another embodiment of a valve body.
Figure 8:
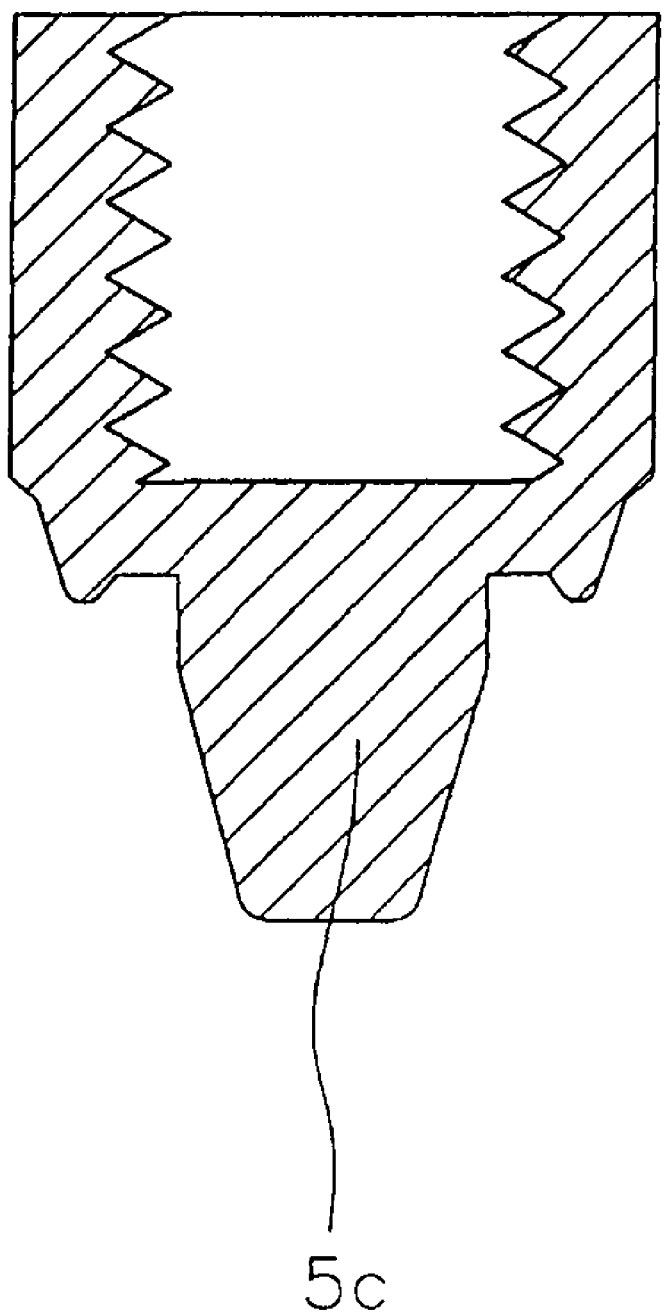
FIG. 8 is a vertical cross-sectional view showing yet another embodiment of a valve body.
Figure 9:
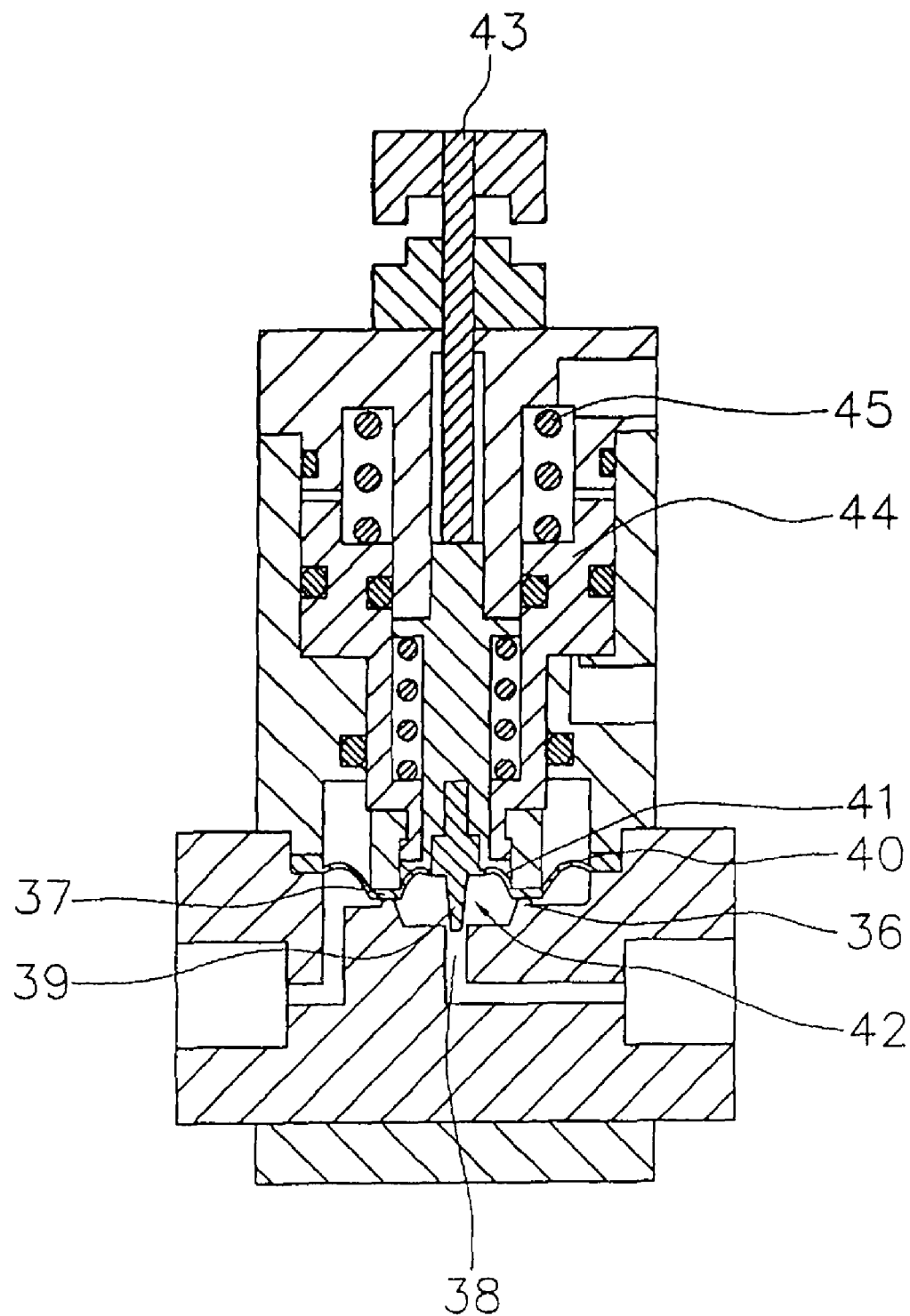
FIG. 9 is a vertical cross-sectional view showing a conventional fluid control valve.

Reference numeral 5 is a PTFE valve body, and is screwed onto and fixed with the joining section 31 provided at the bottom of the first diaphragm 4. The valve body 5 is not limited to the shape as in the present embodiment, and as shown in FIGS. 6 and 7, a spherical valve body 5a or conical valve body 5b may be employed depending on the desired flow characteristics. Further, in order to fully close the valve in a state such that a sliding resistance is reduced to the minimum, a valve body 5c having outer periphery ribs as in FIG. 8 can be suitably used.

Reference numeral 6 is an ethylene-propylene-diene copolymer (EPDM) second diaphragm having in a central hole 23, a thick wall section 24 therearound, an annular protrusion 27 on the thick wall section, a thin film section 25 radially extending from the thick wall section 24, and a seal section 26 provided at the peripheral edge of the thin film section 25; at a shoulder section 28 at an upper section of the rod 7 fixed at its bottom with the attachment section 19 of the first diaphragm 4, the central hole 23 is penetrated by the diaphragm hold-down member 8, thereby sandwiching and fixing the second diaphragm. In the present embodiment, an EPDM material is employed. Alternatively, a fluoro-rubber or PTFE may be also employed.

Reference numeral 7 is a PVC rod having at its upper section with the shoulder section 28 with an enlarged diameter. Into the center of the shoulder section 28 a joining section 33 of the diaphragm hold-down member 8 is screwed, causing the second diaphragm 6 to be sandwiched and fixed. The lower section thereof is disposed with play in the through-hole 15 at the bottom of the cylinder 2, and the lower end is fixed to the attachment section 19 of the first diaphragm 4. Further, a spring 9 is loaded between the lower surface of the shoulder section 28 of the rod 7 and the step section 34 of the cylinder 2.

Reference numeral 8 is a PVC diaphragm hold-down member, having at its lower surface center a joining section 33 that screwingly engages with the rod 7. Further, an annular groove 32 that engages with the annular protrusion 27 of the second diaphragm 6 is provided on the lower surface.

Reference numeral 9 is an SUS spring, which is engaged and supported between the lower surface of the shoulder section 28 of the rod 7 and the step section 34 of the cylinder 2 is in a state such that radial movement is prevented. The spring 9 constantly impels the lower surface of the shoulder section 28 upwards. The entire surface of the spring 9 is coated with a fluorine resin. The spring 9 can be used with a different spring constant depending on the adjustment valve bore and the range of the pressure to be employed, or a plurality of springs may be used.

In the adjustment valve according to the present invention, because the valve body 5 is can be fixed in a detachable manner, the size and shape of the valve body 5 can be changed, and thus the inner design of the main body 1 needs to be changed. However, since other parts can be commonly used, even for a product with a different valve body 5 and main body 1, costs can be reduced.

The operation of the present embodiment will be explained.

Figure 1:
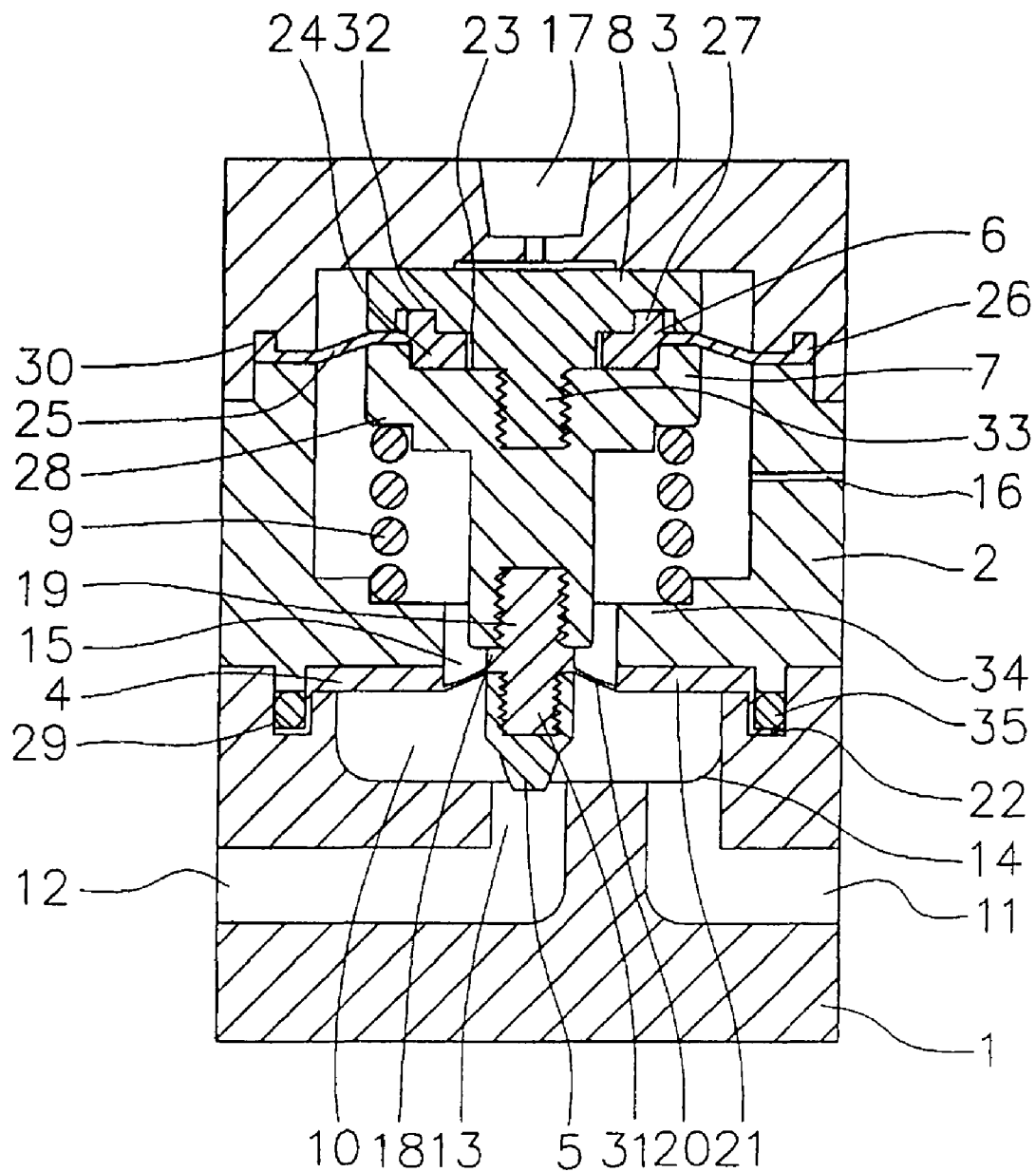
FIG. 1 is a vertical cross-sectional view showing one embodiment of an adjustment valve according to the present invention in an opened state.

FIG. 1 shows an adjustment valve in a state such that no compressed air is supplied from the working fluid communication hole 17 provided on top of the bonnet 3, that is, an open state where the flow of the fluid is at the maximum level. At this time, due to the repulsive force of the spring 9 engaged between the step section 34 of the cylinder 2 and the lower surface of the shoulder section 28 of the rod 7, the valve body 5 stands still at a position where the upper section of the diaphragm hold-down member 8 joined with the upper section of the rod 7 comes in contact with and is stopped at the bottom surface of the bonnet 3.

In this state, when pressure of compressed air supplied from the working fluid communication hole 17 is increased, because the inside of the bonnet 3 is tightly sealed by the thin film section 25 of the second diaphragm 6 the seal section 26 of which is engaged with the bonnet 3 and by the bonnet 3, the compressed air presses the diaphragm hold-down member 8 and second diaphragm 8 downward, causing, via the rod 7 and first diaphragm 4, the valve body 5 to be inserted into the opening 13. Here, when pressure of the compressed air supplied from the working fluid communication hole 17 is made constant, the valve body 5 stands still at a position where the repulsive force of the spring 9 is balanced with the pressure that the lower surface of the thin film section 20 of the first diaphragm 4 and the lower surface of the valve body 5 receive from the fluid (see FIG. 2). Therefore, the area of the opening 13 is reduced by the inserted valve body 5, and the flow of the fluid is also reduced.

Figure 2:
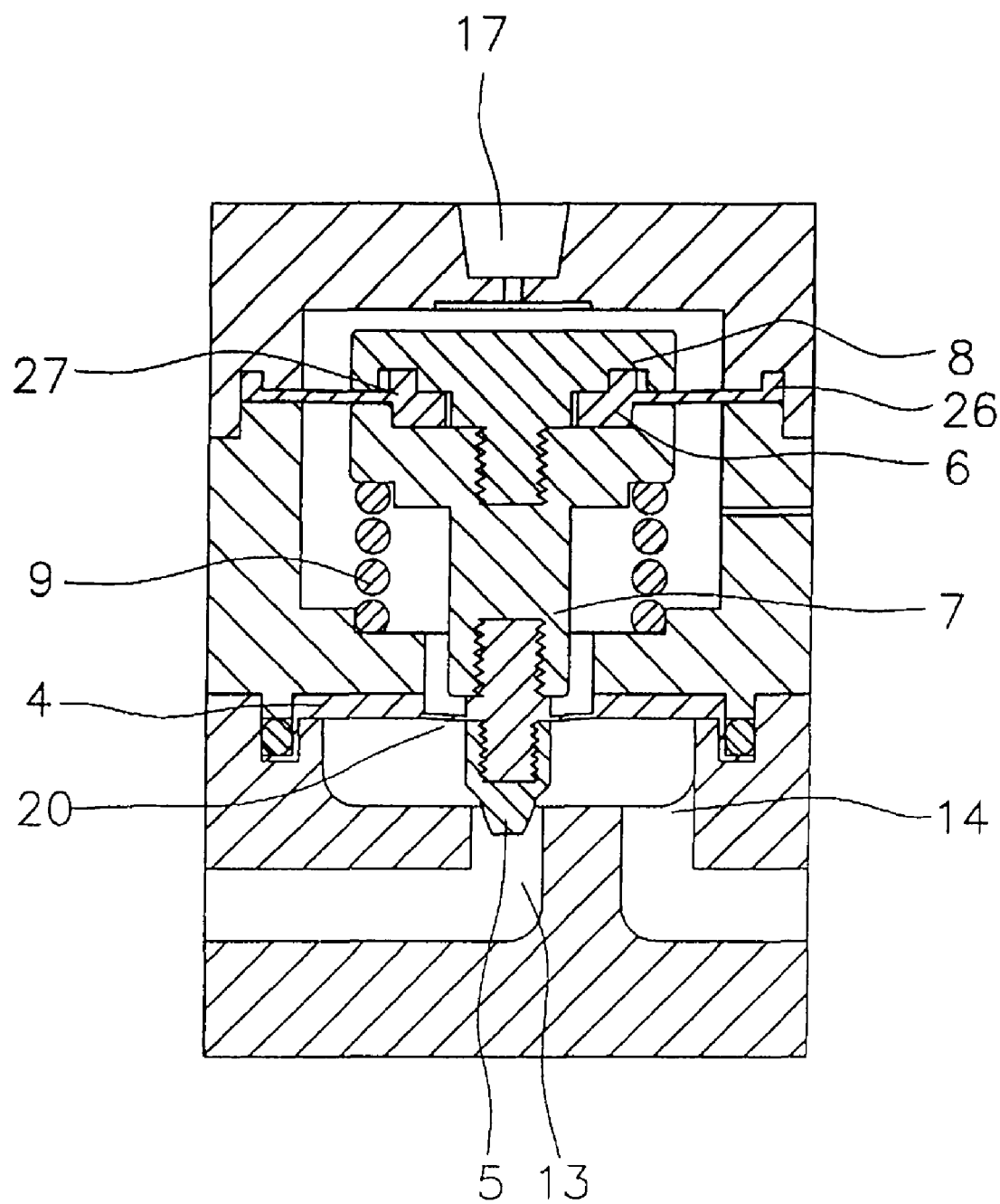
FIG. 2 is a vertical cross-sectional view showing a half-opened state of the adjustment valve in FIG. 1.
Figure 3:
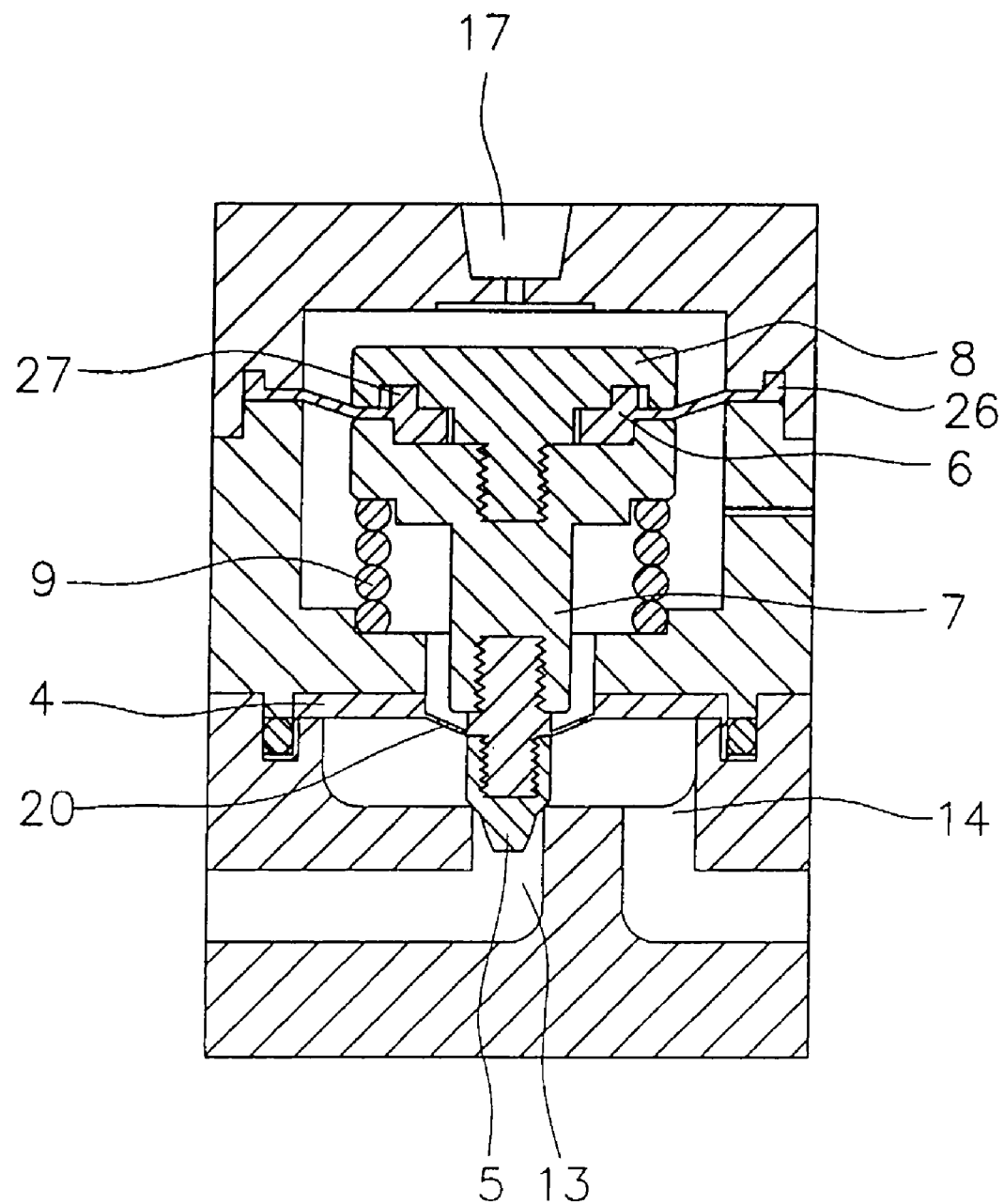
FIG. 3 is a vertical cross-sectional view showing a closed-state of the adjustment valve in FIG. 1.

In the state of FIG. 2, when a pressure of the compressed air supplied from the working fluid communication hole 17 is further increased, the valve body 5 is pressed further downward, ultimately coming in contact with the opening 13 and achieving a fully closed state (see FIG. 3).

In the state of FIG. 3, when compressed air is discharged from the working fluid communication hole 17, the pressure of the interior of the bonnet 3, which is tightly sealed by the thin film section 25 of the second diaphragm 6 the seal section 26 of which engages with the bonnet 3 decreases, so that the repulsive force of the spring 9 becomes larger, thus pushing the rod 7 upwards. With the rod 7 raised, the valve body 5 fixed via the first diaphragm 4 is also upwardly raised, bringing the adjustment valve to an open state (see FIG. 1).

The present invention has the structure explained above, thus achieving the following excellent effects.

(1) Pressure of a working fluid can be changed as desired, thereby enabling adjustment of fluid flow within a broad range.

(2) The pressure-receiving surface area of the first diaphragm thin film section is far smaller than the pressure-receiving surface area of the second diaphragm thin film section, inhibiting influence from fluid pressure and occurrence of hunting even if pressure of the fluid from the inflow channel is increased.

(3) Because the bottom of the rod is fitted with play in a through-hole in the cylinder bottom, there is excellent flow control responsiveness to an increase/decrease of working fluid.

(4) Flow can be regulated using working fluid only, enabling remote operation.

(5) Parts other than the main body and valve body can be commonly used, achieving compact size and lowering product costs.

(6) The valve body can be easily replaced with another valve body in case of corrosion caused by a chemical solution.

(7) The diaphragm seal section is protrudingly provided so as to have an L-shaped cross-section, improving sealing properties.

(8) By providing a ventilation hole in the cylinder to discharge gases generated inside, coating a spring with a fluorine resin, and otherwise providing a structure and constitution that inhibit component corrosion, an adjustment valve having excellent anti-corrosion properties is achieved.

(9) There is no sliding section, thus preventing wear caused by friction, and residue caused by sliding.

The invention claimed is:

1. An adjustment valve, comprising:
   a main body provided with a valve chamber at an upper portion thereof, an inflow channel and outflow channel that respectively communicate with the valve chamber, and an opening at a bottom center of the valve chamber with which the outflow channel communicates; and
   a cylinder provided with a through-hole at the bottom center thereof and a ventilation hole in a lateral surface, the cylinder and main body sandwiching and fixing a first diaphragm therebetween and a bonnet provided with a working fluid communication hole on a top thereof, the bonnet and cylinder sandwiching and engaging the peripheral edge of a second diaphragm therebetween are integrally fixed and wherein:
   the first diaphragm comprises an integrally formed shoulder section, an attachment section being positioned above the shoulder section and engaging with and fixing with the bottom of a rod, a joining section positioned below the shoulder section that fixes a valve body, a thin film section radially extending from the shoulder section, a thick wall section continuous with the thin film section, and a seal section provided at the peripheral edge of the thick wall section;
   the valve body is fixed to the joining section so as to enter and recede from the opening of the valve chamber in response to the vertical movement of the rod;
   the second diaphragm has a central hole, and comprises an integrally formed thick wall section around said central hole, another thin film section radially extending from the integrally formed thick wall section, and another seal section provided at the peripheral edge of the thin film section;
   the central hole of the second diaphragm is penetrated by a diaphragm hold-down member at an upper shoulder section positioned at a top of the rod, said rod being fixed at a bottom thereof with the attachment section, causing the second diaphragm to be sandwiched and fixed between the diaphragm hold-down member and the upper shoulder section; and
   the rod is configured so that a bottom portion thereof is disposed with play in the through-hole at the bottom of the cylinder, and is supported by a spring engaged between a step section of the cylinder and the bottom surface of the upper shoulder section in a state such that radial movement is prevented.

2. An adjustment valve according to claim 1, wherein the valve body is detachably fixed to the joining section of the first diaphragm.

3. An adjustment valve according to claim 1 or 2, wherein the first diaphragm is formed of polytetrafluoroethylene.

4. An adjustment valve according to claim 1 or 2, wherein the seal section of the first diaphragm axially protrudes from the peripheral edge of the thick wall section with an L-shaped cross-section.

5. An adjustment valve according to claim 1 or 2, wherein the opening of the inflow channel of the main body has a roughly crescent-shaped transverse cross-section.

6. An adjustment valve according to claim 1 or 2, wherein the entire surface of the spring is entirely coated with a fluorine resin, and a fluorine resin is employed for other material.

* * * * *